United States Patent
Lai et al.

(10) Patent No.: US 7,702,361 B2
(45) Date of Patent: Apr. 20, 2010

(54) SYSTEM AND METHOD FOR PROVIDING COMMUNICATION AND POSITIONING INFORMATION

(75) Inventors: Duc Dinh Lai, Chantilly, VA (US); Peggy Carol Lee, Potomac, MD (US)

(73) Assignee: Nextel Communications Inc., Reston, VA (US)

( * ) Notice: Subject to any disclaimer, the term of this patent is extended or adjusted under 35 U.S.C. 154(b) by 995 days.

(21) Appl. No.: 11/092,673

(22) Filed: Mar. 30, 2005

(65) Prior Publication Data

US 2006/0229085 A1 Oct. 12, 2006

(51) Int. Cl.
*H04M 1/00* (2006.01)

(52) U.S. Cl. .................. 455/553.1; 455/403; 455/556.1; 455/456.1; 455/458.3; 455/78; 455/90.2

(58) Field of Classification Search ................. 455/403, 455/456.1, 456.6, 556.1, 456.3, 78, 90.2, 455/458.3
See application file for complete search history.

(56) References Cited

U.S. PATENT DOCUMENTS

| | | | | |
|---|---|---|---|---|
| 5,483,676 A * | 1/1996 | Mahany et al. | ............ | 455/67.14 |
| 5,712,899 A * | 1/1998 | Pace, II | .................... | 455/456.2 |
| 5,713,899 A * | 2/1998 | Marnay et al. | ................ | 606/61 |
| 6,226,529 B1 * | 5/2001 | Bruno et al. | ................ | 455/557 |
| 6,480,557 B1 * | 11/2002 | Rog et al. | .................... | 375/349 |
| 6,522,265 B1 * | 2/2003 | Hillman et al. | ............. | 340/988 |
| 6,529,493 B1 * | 3/2003 | Varin | .......................... | 370/337 |
| 6,747,597 B2 * | 6/2004 | Choi | ....................... | 342/357.1 |
| 6,754,584 B2 * | 6/2004 | Pinto et al. | .................. | 701/215 |
| 6,844,845 B1 * | 1/2005 | Whiteside et al. | ........ | 342/357.1 |
| 7,097,108 B2 * | 8/2006 | Zellner et al. | ................ | 235/492 |
| 7,120,417 B2 * | 10/2006 | Shoki et al. | ................. | 455/403 |
| 7,136,751 B2 * | 11/2006 | Pinto et al. | ................... | 701/215 |
| 7,230,316 B2 * | 6/2007 | Yamazaki et al. | ........... | 257/531 |
| 7,246,746 B2 * | 7/2007 | McNamara et al. | ......... | 235/385 |
| 7,292,866 B2 * | 11/2007 | Shoki et al. | .............. | 455/456.1 |
| 7,298,322 B2 * | 11/2007 | Piekarz | ................... | 342/357.12 |
| 2002/0082992 A1 * | 6/2002 | Ritter | .......................... | 705/41 |
| 2004/0203834 A1 * | 10/2004 | Mahany | ...................... | 455/453 |
| 2005/0043888 A1 * | 2/2005 | Kang | .......................... | 701/213 |
| 2005/0065779 A1 * | 3/2005 | Odinak | ....................... | 704/201 |
| 2005/0227650 A1 * | 10/2005 | Williams | .................. | 455/179.1 |
| 2006/0091223 A1 * | 5/2006 | Zellner et al. | ................ | 235/492 |
| 2006/0142913 A1 * | 6/2006 | Coffee et al. | ................... | 701/35 |
| 2007/0162666 A1 * | 7/2007 | Ise | ............................... | 710/62 |
| 2008/0146260 A1 * | 6/2008 | Rofougaran | ................. | 455/466 |
| 2008/0146270 A1 * | 6/2008 | Rofougaran | .............. | 455/552.1 |
| 2008/0153541 A1 * | 6/2008 | Rakshani et al. | .......... | 455/552.1 |

* cited by examiner

*Primary Examiner*—Matthew D Anderson
*Assistant Examiner*—April G Gonzales

(57) ABSTRACT

A communication module capable of simultaneously providing communication and positioning information is provided. The communication module includes a processor with an integrated positioning receiver. The processor transmits and receives communication information, such as interconnect voice, dispatch voice, or data, using a first transceiver. The integrated positioning receiver is coupled to a second transceiver to transmit positioning information.

12 Claims, 1 Drawing Sheet

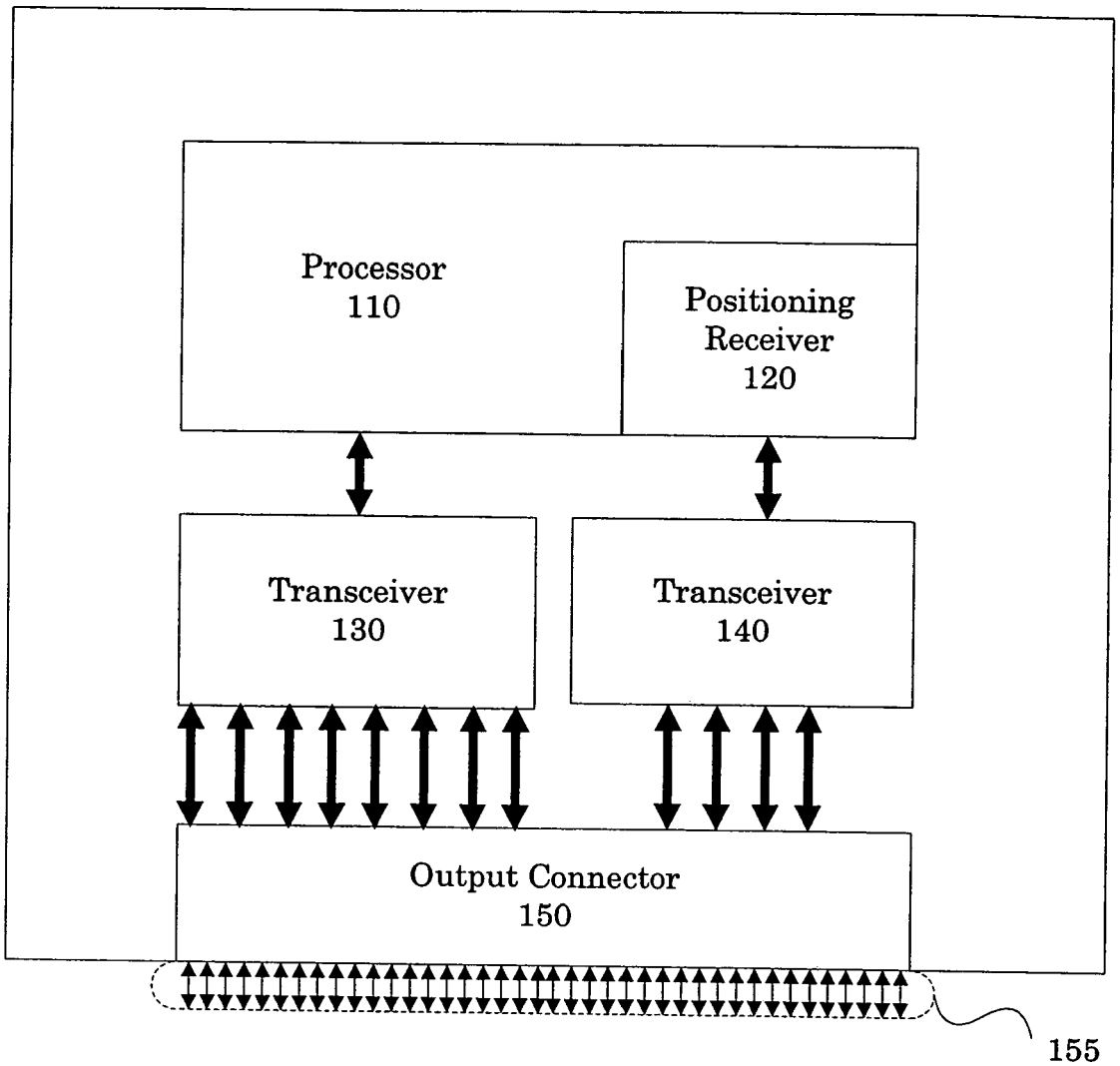
FIGURE

SYSTEM AND METHOD FOR PROVIDING COMMUNICATION AND POSITIONING INFORMATION

BACKGROUND OF THE INVENTION

Wireless communication devices, such as cellular telephones, currently provide a number of different capabilities. For example, many wireless communication devices can support voice and data communications. Additionally, many wireless communication devices now include global positioning satellite (GPS) receivers, which are used for determining a current position of the device based on information received from satellites.

Although wireless communication devices support a number of different capabilities, due to the design of these devices, they cannot simultaneously output information related to these different capabilities. For example, GPS receivers are often integrated into the communication processor of the wireless communication device. The communication processor is typically coupled to other components via a single serial connection. The serial connection can send or receive information associated with only one of the many capabilities at any particular time. Accordingly, while a wireless communication device may include an external connection for providing data and GPS information, the external connection can communicate only one of these types of information at a time.

SUMMARY OF THE INVENTION

The present invention overcomes the above-identified and other deficiencies of conventional wireless communication devices by providing separate serial transceivers for different capabilities provided by a processor of a communication module. Specifically, a first transceiver is coupled to a processor to transmit and receive communication information, while a second transceiver is coupled to the processor to transmit positioning information and receive positioning requests. The first transceiver is coupled to the processor and the second transceiver is coupled to a positioning receiver, which is integrated in the processor.

Other objects, advantages and novel features of the present invention will become apparent from the following detailed description of the invention when considered in conjunction with the accompanying drawings.

BRIEF DESCRIPTION OF THE DRAWING FIGURES

The sole FIGURE is a block diagram of an exemplary communication module in accordance with the present invention.

DETAILED DESCRIPTION OF THE PREFERRED EMBODIMENTS

FIG. 1 illustrates an exemplary communication module in accordance with the present invention. The communication module includes a processor 110, which includes an integrated positioning receiver 120. The processor can be a microprocessor, application specific integrated circuit (ASIC), field programmable gate array (FPGA), or the like. The positioning receiver can be any type of positioning receiver, such as a global positioning satellite (GPS) receiver. Additionally, the positioning receiver 120 will also include transmission capabilities in order to provide the positioning information to external components. For example, requests for positioning information can be transmitted to the positioning receiver 120, which can determine a current position and transmit the results to the requester.

The processor 110 is coupled to first and second transceivers 130 and 140. Transceivers 130 and 140 are serial transceivers, such as universal asynchronous receiver transmitters (UARTs). The processor 110 is coupled to the first transceiver 130 to transmit and receive communication information, including interconnect voice, dispatch voice, packet data, circuit-switched data, facsimile, short message service (SMS), or the like. The integrated positioning receiver 120 of processor 110 is coupled to the second transceiver 140. The first and second transceivers 130 and 140 are coupled to an output connector 150. The first and second transceivers 130 and 140 can communicate with an external device or module in accordance with the RS-232 serial communication standard via output connector 150. Alternatively, the transceivers can communicate with external devices or modules using any serial communication protocol, such as universal serial bus (USB) protocol, or the like.

Output connector 150 includes connections 155 for coupling the communication module to external devices or modules. The connections 155 include connections dedicated to the information for transceiver 130 and connections dedicated to the information for transceiver 140. Accordingly, communication information from processor 110 and positioning information from positioning receiver 120 can be simultaneously output from the communication module. Similarly, communication information for processor 110 and positioning information for positioning receiver 120 can be simultaneously input to the communication module.

The communication module of the present invention is particularly useful for embedded applications, including handheld scanners, automatic vehicle locator devices, customer relations management devices, sales force automation devices, remote monitoring, telemetry, point of sale devices, personal digital assistants (PDAs), and the like. Specifically, manufacturers of any of the aforementioned devices typically specialize in the design of these devices. The communication module of the present invention can be designed to operate according to any wireless communication standard, including, TDMA, GSM, CDMA, iDEN, or the like. Accordingly, a device manufacturer can employ a single design and include a communication module compatible with the desired wireless communication standard. This allows the device manufacturer to easily offer devices which are compatible with different wireless macro networks, without the time and expense required to design their own communication modules.

The communication module of the present invention can also be used as a component of a wireless telephone, and connector 150 can couple the communication module to an external computer. Accordingly, the computer can simultaneously communicate both communication information, such as packet or circuit-switched data, and positioning information with the communication module.

The description above referred generally to positioning information. It should be recognized that the positioning information can be a location identification, such as latitude and longitude coordinates, or can be other information, such as time information received from the GPS satellites. For example, GPS satellites transmit timing information which is used for location determination. However, the timing information can be used to time stamp other information. For example, if the module is integrated into a remote sensor, the sensor readings can be transmitted to a monitoring station, along with a time stamp based on the information received from the GPS satellites.

It should be recognized that only those components necessary for an understanding of the present invention have been described. For example, it will be recognized that the communication module will include an antenna connector for transmission and reception of communication and positioning information. Additionally, power inputs, audio inputs and outputs, a subscriber identity module (SIM) input, and the like are provided on the module.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A communication module, comprising:
    a processor with a first output, which transmits and receives communication information, and a second output, which transmits positioning information;
    a first transceiver, external to the processor, coupled to the first output of the communication processor;
    a second transceiver, external to the processor, coupled to the second output of the communication processor; and
    an output connector, wherein the processor is coupled to the output connector by way of the first and second transceivers, wherein the processor includes an integrated positioning receiver used for determining the location of the communication module.

2. The communication module of claim 1, wherein the positioning receiver is a global positioning satellite (GPS) receiver.

3. The communication module of claim 1, wherein the processor outputs communication information and positioning information simultaneously.

4. The communication module of claim 1, wherein the communication information including at least one of interconnect voice, dispatch voice, packet data, circuit-switched data, facsimile and short message service (SMS), and the processor transmits communication information and the positioning receiver transmits positioning information simultaneously.

5. The communication module of claim 4, wherein the first and second transceivers are universal asynchronous receiver transmitters (UARTs).

6. The communication module of claim 4, wherein the communication module is a component of a wireless telephone.

7. The communication module of claim 4, wherein the communication module is a component of a bar code scanner.

8. A communication module, comprising:
    a first transceiver;
    a second transceiver;
    a processor with an integrated positioning receiver, a first output coupled to the first transceiver to transmit and receive communication information using the first transceiver, a second output coupled to the second transceiver to transmit positioning information using the second transceiver, the communication information including at least one of interconnect voice, dispatch voice, packet data, circuit-switched data, facsimile and short message service (SMS), and the processor transmits communication information and the positioning receiver transmits positioning information simultaneously,
    wherein the second output is coupled directly to the integrated positioning receiver, wherein the first and second transceivers are external to the processor.

9. The communication module of claim 8, wherein the first and second transceivers are universal asynchronous receiver transmitters (UARTs).

10. The communication module of claim 8, wherein the communication module is a component of a wireless telephone.

11. The communication module of claim 8, wherein the communication module is a component of a bar code scanner.

12. The communication module of claim 8, further comprising:
    an output connector, wherein the processor is coupled to the output connector by way of the first and second transceivers.

* * * * *